United States Patent Office 3,776,996
Patented Dec. 4, 1973

3,776,996
METHODS OF PROVIDING END FITTINGS
ON HOSES
James Brisbane Cameron and Bernard Piet Walton-Knight, London, England, asssignors to BTR Industries Limited, London, England
Filed Aug. 12, 1971, Ser. No. 171,245
Claims priority, application Great Britain, Aug. 13, 1970, 39,091/70
Int. Cl. B32b 1/10
U.S. Cl. 264—242
2 Claims

ABSTRACT OF THE DISCLOSURE

A method of providing an end fitting in the end portion of a hose, by forming a mould around the hose end portion, so that the end portion is a part of the mould, and then injecting a hardenable material into the mould so that the moulded part is moulded to the end portion. The bore of the hose may be closed by a removable plug prior to the moulding. An end fitting nut may be positioned around the end portion to form a part of the mould, and the nut may be threaded on the plug; prior to the plug being used to close the bore of the hose.

---

The invention relates to methods of providing end fittings on hoses.

The invention provides a method of providing an end fitting on the end portion of a hose which method comprises the steps of forming a mould for at least a part of the end fitting around the end portion with the end portion forming a part of the mould, and injecting hardenable material into the mould to form a part of the end fitting such that the moulded part is moulded on to the end portion of the hose.

Another part of the mould be formed by positioning an end fitting nut co-axially around the end portion before the injection moulding step, so that the nut forms another part of the end fitting when the injection moulding step is completed.

In the last described method, the nut used may be formed with at least one generally radially disposed inwardly facing rib or outwardly facing groove on its inner surface whereby the nut is retained on the moulded part of the fitting by the rib on groove after the injection moulding step is completed.

The nut used and the material moulded in the injection moulding step may be such that the nut is free to turn on the moulded part of the end fitting after the injection moulding step is completed.

In any of the above described methods the bore of the hose may be closed by means of a removable plug before the injection moulding step.

The nut, when used, may be threaded on to a correspondingly threaded portion provided on the removable plug prior to the plug being used to close the bore of the hole.

The free end of the end fitting may be moulded by a suitably shaped portion provided on the removable plug, which portion forms a further part of the mould.

The invention also provides a hose end portion having an end fitting made by any of the above described methods.

By way of example, four specific embodiments of end fittings formed in accordance with the method of the invention will now be described, reference being made to the accompanying drawings, in which.

The method is described in connection with an end fitting to be attached to the end portion of a flexible nylon hose 10. However, it will be appreciated that the method may be employed with other polymeric hoses—such as thermoplastic or thermosetting elastomers or flexible thermoplastics materials.

Figure 1:
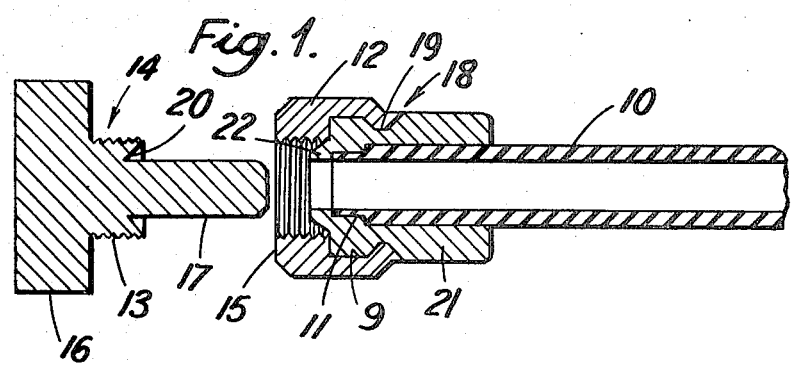
FIG. 1 is a cross-sectional view through the first embodiment.

Referring first to FIG. 1, the hose 10 is cut to length, and the outer surface of a portion 11 immediately adjacent the free end of the hose is cut back to reduce the wall thickness thereof. A plug 14 is used to close off the bore of the hose, the plug 14 having a plain portion 17 which fits within the hose and a threaded portion 13, the diameter of which is greater than the plain portion 17. The end of the plug adjacent the threaded portion 13 is provided with a flange 16, and the shoulder 20 between the threaded portion 13 and the plane portion 17 is formed as a part conical surface tapering inwardly towards the flange 16. A part of a mould is formed around the end portion of the hose by threading a hose end fitting nut 12 on to the threaded portion 13 of the plug 14 so that the end face 15 of the nut abuts the flange 16 of the plug, and then inserting the plane portion 17 of the plug into the bore of the hose so that the unthreaded inner surface 9 of the nut 12 surrounds co-axially and is spaced from the end portion of the hose. The end part 18 of the nut 12 remote from the flange 16 is provided with an inwardly facing rib 19, which rib is spaced radially from the hose 10.

The hose end with the plug and nut assembled as described above is then placed in an injection moulding die, which die in conjunction with the part mould described above forms a mould for completing the end fitting. A polymeric material is then injection moulded within the injection moulding die, in such a way that a part 21 of the end fitting is formed, which part 21 bonds with the hose body. It will be appreciated that the injection moulded material may be a thermosetting or a thermoplastics material, for example, a polyamide or a polyurethane.

After the moulding step is completed, and the plastics material has cooled, the nut becomes free to turn on the plastics material due to the contraction thereof. The nut is unthreaded from the plug 14, which plug is then pulled free from the bore of the hose. The end fitting, having a conical nose piece 22 within the threaded portion of the nut 12 and formed during the moulding step by the shoulder 20, is then ready for use in conjunction with a union or the like having a threaded portion on which the nut 12 may be screwed, and a conical sealing surface against which the nose piece 22 may seal.

In the second embodiment of end fitting, the method of making the fitting is very similar to that just described. However, in this embodiment, the unthreaded portion 26 of the nut 25 is elongated, and the injection moulding die is shaped so that when used in conjunction with the part of the mould defined by the nut 25, the shoulder on the plug and the hose end portion itself, the moulded part 27 of the end fitting is completely encapsulated within the unthreaded portion 26 of the nut.

Figure 3:
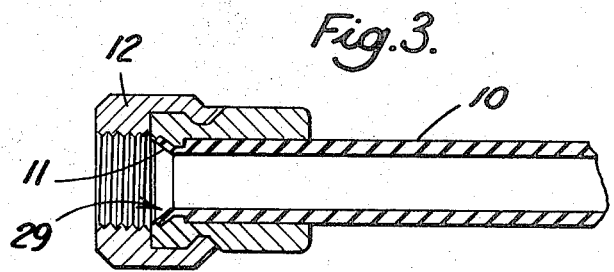
FIG. 3 is a cross-sectional view through the third embodiment.

The third example of end fitting, shown in FIG. 3, closely resembles that shown in FIG. 1, and the method of forming the end fitting is similar. However, in this embodiment, the shoulder between the threaded and plane portions of the plug used to close the bore of the hose tapers conically inwardly away from the flange of the plug. The portion 11 of the hose having a reduced wall thickness is thus flared outwardly when the plug is inserted into the bore of the hose, and after the end fitting has been completed the end fitting has a flared sealing surface within the end fitting nut.

Figure 2:
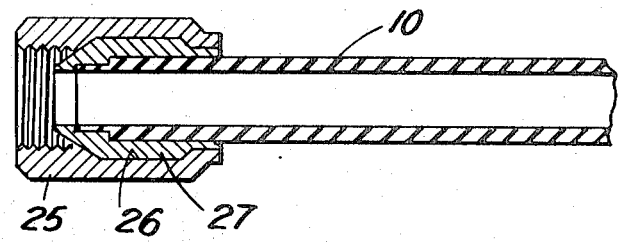
FIG. 2 is a cross-sectional view through the second embodiment.
Figure 4:
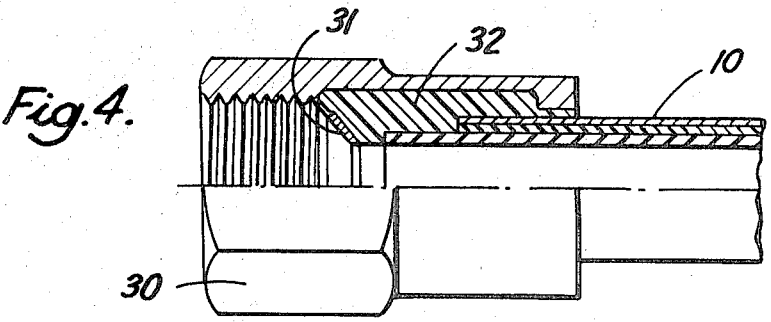
FIG. 4 is a cross-sectional view through the fourth embodiment.

FIG. 4 shows a fourth embodiment of end fitting, in which the end fitting nut 30 is similar to that employed in connection with the embodiment shown in FIG. 2, and in which the free end of the moulded part of the end fitting is formed as described in connection with FIG. 3 to provide an outwardly flared sealing face. However, in this embodiment a soft rubber washer 31 is bonded to the moulded part of the end fitting during the moulding step, the rubber washer being located on the plug adjacent the conical shoulder before the plug is inserted into the bore of the hose. When the end fitting shown in FIG. 4 is attached to a union therefor, the soft rubber washer is compressed against a conically formed nipple in the union and thus forms a seal between the nipple and the moulded part 32 of the end fitting.

It will be understood that in any of the above embodiments of end fitting, the hose used may be unreinforced or reinforced with, for example, metallic, synthetic or natural materials in the form of braid, tapes, laps, knits, weaves or in other forms. The injected plastics material must be of a type suitable for bonding with the hose body, but not with the end fitting nut. For example, the injected plastics material may be a nylon with or without a glass fibre filling. The hose body may be chemically treated before moulding to facilitate the bonding. The nut may be made from any material having a melting point higher than that of the moulded material, and may be treated to prevent the moulded material adhering to it; for example, the nut may be of steel, brass, a polysulphone, or a fabric reinforced phenol formaldehyde resin.

It will be appreciated that in the first and third described embodiments, the moulded part of the end fitting on the hose, when carrying a pressurized fluid, withstands the greater part of the bursting load, whereas in the second and fourth described embodiments, the bursting load is shared between the nut and the encapsulated moulded part of the end fitting.

We claim:

1. A method of providing a captive rotatable connecting nut rotatably mounted on an end portion of a hose which method comprises the steps of:

providing a nut with an inwardly facing rib, said nut being of a material which will not bond to a subsequently injection molded material;

providing a removable plug having a portion capable of extending into an end of the hose;

inserting the plug through the nut and into the bore of the base thereby aligning the nut concentric with an end portion of the hose and forming a mold around the end portion of the hose with the end portion, a portion of the nut, and the plug forming parts of the mold;

injecting a hardenable material into the mold which material is molded onto the end portion of the hose to become rigid therewith and engages the inwardly facing rib of said nut to trap the nut on the nose, and by reason of its contraction during cooling, the material permits the nut to rotate thereabout without relative axial displacement due to the nut abutment surfaces.

2. A method as claimed in claim 1, wherein the removable plug has a portion correspondingly threaded to the nut, and further comprising the step of threading the nut onto said portion on the plug prior to the closing step.

References Cited

UNITED STATES PATENTS

| | | | |
|---|---|---|---|
| 2,561,351 | 7/1951 | Fentress | 264—262 X |
| 3,286,010 | 10/1966 | Gironingen | 264—242 |
| 3,270,114 | 8/1966 | Westlake | 264—262 X |
| 2,904,845 | 9/1959 | Sperry | 264—242 |
| 3,445,559 | 5/1969 | Siteman | 264—278 X |
| 2,644,218 | 7/1953 | Kennison | 264—262 |

ROBERT F. WHITE, Primary Examiner

T. P. PAVELKO, Assistant Examiner

U.S. Cl. X.R.

264—262, 264, 278; 285—238, 247, 248, 423